(12) United States Patent
Quintana (10) Patent No.: US 12,501,938 B2
(45) Date of Patent: Dec. 23, 2025

(54) HEATING CONTROL FOR VAPORIZING DEVICE

(71) Applicant: NJOY, LLC, Scottsdale, AZ (US)

(72) Inventor: Reynaldo Quintana, Menlo Park, CA (US)

(73) Assignee: NJOY, LLC, New York, NY (US)

( * ) Notice: Subject to any disclaimer, the term of this patent is extended or adjusted under 35 U.S.C. 154(b) by 860 days.

(21) Appl. No.: 17/748,499

(22) Filed: May 19, 2022

(65) Prior Publication Data

US 2022/0273041 A1  Sep. 1, 2022

Related U.S. Application Data

(63) Continuation of application No. 14/832,202, filed on Aug. 21, 2015, now Pat. No. 11,350,669.

(60) Provisional application No. 62/040,732, filed on Aug. 22, 2014.

(51) Int. Cl.
| | |
|---|---|
| *H05B 3/16* | (2006.01) |
| *A24F 40/50* | (2020.01) |
| *F22B 1/28* | (2006.01) |
| *H05B 1/02* | (2006.01) |
| *A24F 40/10* | (2020.01) |

(52) U.S. Cl.
CPC ............ *A24F 40/50* (2020.01); *F22B 1/28* (2013.01); *F22B 1/284* (2013.01); *H05B 1/0252* (2013.01); *H05B 3/16* (2013.01); *A24F 40/10* (2020.01); *H05B 2203/014* (2013.01); *H05B 2203/021* (2013.01); *H05B 2203/022* (2013.01)

(58) Field of Classification Search
CPC .. A24F 40/50; A24F 40/10; F22B 1/28; F22B 1/284; H05B 1/0252; H05B 3/16; H05B 2203/014; H05B 2203/021; H05B 2203/022
USPC ................................. 392/397; 131/328, 329
See application file for complete search history.

(56) References Cited

U.S. PATENT DOCUMENTS

| | | | |
|---|---|---|---|
| 374,584 A | 12/1887 | Cook |
| 576,653 A | 2/1897 | Bowlby |
| 595,070 A | 12/1897 | Oldenbusch |
| 799,844 A | 9/1905 | Fuller |

(Continued)

FOREIGN PATENT DOCUMENTS

| | | | |
|---|---|---|---|
| CN | 201290340 Y | 8/2009 |
| CN | 101869356 A | 10/2010 |

(Continued)

*Primary Examiner* — Jimmy Chou
(74) *Attorney, Agent, or Firm* — Harness, Dickey & Pierce, P.L.C.

(57) ABSTRACT

The temperature of a vaporizing device, e.g., the temperature of a heating element of the vaporizing device, may be controlled according to various aspects of the present disclosure. The vaporizing device may comprise a heating element, a power source, at least one sensor in electronic communication with the heating element and the power source, and a processor configured to control the temperature of the heating element. The method of controlling the temperature may comprise receiving a resistance measurement of the heating element from the at least one sensor, determining the temperature of the heating element based on the resistance measurement, and adjusting the amount of power supplied to the heating element based on the determined temperature of the heating element.

20 Claims, 4 Drawing Sheets

(56) References Cited

U.S. PATENT DOCUMENTS

| | | |
|---|---|---|
| 969,076 A | 8/1910 | Pender |
| 1,067,531 A | 7/1913 | MacGregor |
| 1,163,183 A | 12/1915 | Stoll |
| 1,299,162 A | 4/1919 | Fisher |
| 1,505,748 A | 8/1924 | Tamis |
| 1,552,877 A | 9/1925 | Phillipps et al. |
| 1,632,335 A | 6/1927 | Hiering |
| 1,706,244 A | 3/1929 | Meyerson |
| 1,845,340 A | 2/1932 | Ritz |
| 1,972,118 A | 9/1934 | McDill |
| 1,998,683 A | 4/1935 | Montgomery |
| 2,031,363 A | 2/1936 | Erikson |
| 2,039,559 A | 5/1936 | Segal |
| D107,794 S | 1/1938 | Rathbun |
| 2,231,909 A | 2/1941 | Hempel |
| 2,327,120 A | 8/1943 | McCoon |
| 2,460,427 A | 2/1949 | Musselman et al. |
| 2,483,304 A | 9/1949 | Vogel |
| 2,502,561 A | 4/1950 | Ebert |
| 2,765,949 A | 10/1956 | Hillman |
| 2,897,958 A | 8/1959 | Tarleton |
| 3,146,937 A | 9/1964 | Vesak |
| D207,179 S | 3/1967 | Kanamara |
| 3,420,360 A | 1/1969 | Young |
| 3,567,014 A | 3/1971 | Feigelman |
| 3,743,136 A | 7/1973 | Chambers |
| 3,861,523 A | 1/1975 | Fountain et al. |
| 3,941,300 A | 3/1976 | Troth |
| D244,355 S | 5/1977 | Mazie et al. |
| D244,784 S | 6/1977 | O'Brien |
| D251,360 S | 3/1979 | Collin |
| 4,207,976 A | 6/1980 | Herman |
| D269,068 S | 5/1983 | Mann et al. |
| 4,460,105 A | 7/1984 | Cox |
| 4,519,319 A | 5/1985 | Howlett |
| 4,771,796 A | 9/1988 | Myer |
| 4,798,310 A | 1/1989 | Kasai et al. |
| 4,813,536 A | 3/1989 | Willis |
| 4,848,375 A | 7/1989 | Patron et al. |
| 4,848,563 A | 7/1989 | Robbins |
| 5,005,759 A | 4/1991 | Bouche |
| 5,123,530 A | 6/1992 | Lee |
| 5,269,327 A | 12/1993 | Counts et al. |
| 5,465,738 A | 11/1995 | Rowland |
| 5,566,855 A | 10/1996 | Bradach |
| 5,605,226 A | 2/1997 | Hernlein |
| D379,248 S | 5/1997 | Khemarangsan |
| 5,641,064 A | 6/1997 | Goserud |
| 5,746,587 A | 5/1998 | Racine et al. |
| 5,810,164 A | 9/1998 | Rennecamp |
| 5,881,884 A | 3/1999 | Podosek |
| 5,938,018 A | 8/1999 | Keaveney et al. |
| 5,967,310 A | 10/1999 | Hill |
| 5,975,415 A | 11/1999 | Zehnal |
| 5,979,460 A | 11/1999 | Matsumura |
| 6,050,420 A | 4/2000 | Green |
| 6,125,082 A | 9/2000 | Reid |
| D441,494 S | 5/2001 | Chen |
| 6,269,966 B1 | 8/2001 | Pallo et al. |
| 6,386,371 B1 | 5/2002 | Parsons |
| 6,431,363 B1 | 8/2002 | Hacker |
| 6,446,793 B1 | 9/2002 | Layshock |
| 6,474,342 B1 | 11/2002 | Rennecamp |
| 6,510,982 B2 | 1/2003 | White et al. |
| D472,463 S | 4/2003 | Kinigakis |
| 6,557,708 B2 | 5/2003 | Polacco |
| 6,622,867 B2 | 9/2003 | Menceles |
| 6,672,762 B1 | 1/2004 | Faircloth |
| 6,726,006 B1 | 4/2004 | Funderburk et al. |
| D498,877 S | 11/2004 | Sher |
| 7,000,775 B2 | 2/2006 | Gelardi |
| D528,411 S | 9/2006 | Nehus et al. |
| 7,167,776 B2 * | 1/2007 | Maharajh ............... F22B 35/18 392/394 |
| D548,592 S | 8/2007 | Kudo et al. |
| 7,374,048 B2 | 5/2008 | Mazurek |
| D575,149 S | 8/2008 | Baranowski |
| 7,546,703 B2 | 6/2009 | Johnske et al. |
| 7,621,403 B2 | 11/2009 | Althoff et al. |
| 7,644,823 B2 | 1/2010 | Gelardi et al. |
| D613,171 S | 4/2010 | Sempe |
| D625,466 S | 10/2010 | Martin |
| 7,815,332 B1 | 10/2010 | Smith |
| 7,886,507 B2 | 2/2011 | McGuinness, Jr. |
| 7,988,034 B2 | 8/2011 | Pezzoli |
| 8,141,701 B2 | 3/2012 | Hodges |
| 8,443,534 B2 | 5/2013 | Goodfellow et al. |
| D683,898 S | 6/2013 | Liu |
| 8,464,867 B2 | 6/2013 | Holloway et al. |
| D690,461 S | 9/2013 | Chen |
| 8,539,959 B1 | 9/2013 | Scatterday |
| 8,596,460 B2 | 12/2013 | Scatterday |
| D700,070 S | 2/2014 | Markovic |
| 8,689,805 B2 | 4/2014 | Hon |
| 8,794,434 B2 | 8/2014 | Scatterday et al. |
| D721,577 S | 1/2015 | Scatterday |
| D725,823 S | 3/2015 | Scatterday et al. |
| 9,010,335 B1 | 4/2015 | Scatterday |
| 9,089,166 B1 | 7/2015 | Scatterday |
| 2001/0032795 A1 | 10/2001 | Weinstein et al. |
| 2001/0052480 A1 | 12/2001 | Kawaguchi et al. |
| 2002/0043554 A1 | 4/2002 | White et al. |
| 2002/0175164 A1 | 11/2002 | Dees et al. |
| 2003/0063523 A1 | 4/2003 | Mulaw |
| 2003/0089377 A1 | 5/2003 | Hajaligol et al. |
| 2003/0226837 A1 * | 12/2003 | Blake ..................... A24F 40/50 219/535 |
| 2004/0039487 A1 | 2/2004 | Fennewald |
| 2004/0105665 A1 | 6/2004 | Schuster |
| 2004/0149624 A1 | 8/2004 | Wischusen, III et al. |
| 2004/0149737 A1 * | 8/2004 | Sharpe .................. A24F 40/465 219/635 |
| 2004/0216753 A1 | 11/2004 | Fox |
| 2005/0061759 A1 | 3/2005 | Doucette |
| 2005/0118545 A1 | 6/2005 | Wong |
| 2005/0145533 A1 | 7/2005 | Seligson |
| 2005/0172976 A1 | 8/2005 | Newman et al. |
| 2005/0236282 A1 | 10/2005 | Huska |
| 2006/0054676 A1 | 3/2006 | Wischusen, III |
| 2006/0150991 A1 | 7/2006 | Lee |
| 2006/0254948 A1 | 11/2006 | Herbert et al. |
| 2006/0255105 A1 | 11/2006 | Sweet |
| 2007/0062548 A1 | 3/2007 | Horstmann et al. |
| 2007/0098148 A1 | 5/2007 | Sherman |
| 2007/0235046 A1 | 10/2007 | Gedevanishvili |
| 2007/0267033 A1 | 11/2007 | Mishra et al. |
| 2008/0092912 A1 | 4/2008 | Robinson et al. |
| 2008/0241255 A1 | 10/2008 | Rose et al. |
| 2008/0276947 A1 | 11/2008 | Martzel |
| 2009/0095311 A1 | 4/2009 | Han |
| 2009/0107493 A1 | 4/2009 | Liu |
| 2009/0267252 A1 | 10/2009 | Ikeyama |
| 2009/0288669 A1 | 11/2009 | Hutchens |
| 2010/0000672 A1 | 1/2010 | Fogle |
| 2010/0031968 A1 | 2/2010 | Sheikh et al. |
| 2010/0186757 A1 | 7/2010 | Crooks et al. |
| 2010/0200006 A1 | 8/2010 | Robinson et al. |
| 2010/0242974 A1 | 9/2010 | Pan |
| 2010/0275938 A1 | 11/2010 | Roth et al. |
| 2010/0276333 A1 | 11/2010 | Couture |
| 2010/0307116 A1 | 12/2010 | Fisher |
| 2011/0049226 A1 | 3/2011 | Moreau et al. |
| 2011/0155153 A1 | 6/2011 | Thorens et al. |
| 2011/0162667 A1 | 7/2011 | Burke et al. |
| 2011/0168194 A1 | 7/2011 | Hon |
| 2011/0180433 A1 | 7/2011 | Rennecamp |
| 2011/0232654 A1 | 9/2011 | Mass |
| 2011/0240494 A1 | 10/2011 | Vecchi |
| 2011/0265806 A1 | 11/2011 | Alarcon et al. |
| 2011/0277780 A1 | 11/2011 | Terry et al. |
| 2011/0278189 A1 | 11/2011 | Terry et al. |
| 2011/0315701 A1 | 12/2011 | Everson |
| 2012/0060853 A1 | 3/2012 | Robinson et al. |
| 2012/0111347 A1 | 5/2012 | Hon |

(56) References Cited

U.S. PATENT DOCUMENTS

| | | |
|---|---|---|
| 2012/0204889 A1 | 8/2012 | Xiu |
| 2012/0227753 A1 | 9/2012 | Newton |
| 2012/0261286 A1 | 10/2012 | Holloway et al. |
| 2012/0267383 A1 | 10/2012 | Van Rooyen |
| 2013/0140200 A1 | 6/2013 | Scatterday |
| 2013/0228191 A1 | 9/2013 | Newton |
| 2013/0247924 A1 | 9/2013 | Scatterday et al. |
| 2013/0248385 A1 | 9/2013 | Scatterday et al. |
| 2013/0276802 A1 | 10/2013 | Scatterday |
| 2013/0284190 A1 | 10/2013 | Scatterday et al. |
| 2013/0284191 A1 | 10/2013 | Scatterday et al. |
| 2013/0313139 A1 | 11/2013 | Scatterday et al. |
| 2013/0319435 A1 | 12/2013 | Flick |
| 2013/0341218 A1 | 12/2013 | Liu |
| 2014/0014124 A1 | 1/2014 | Glasberg et al. |
| 2014/0014126 A1* | 1/2014 | Peleg ............... A24F 40/10 374/54 |
| 2014/0053858 A1* | 2/2014 | Liu ............... A24F 40/40 131/329 |
| 2014/0096781 A1* | 4/2014 | Sears ............... A24F 40/60 131/328 |
| 2014/0123990 A1* | 5/2014 | Timmermans ......... A24F 40/60 131/328 |
| 2014/0182610 A1* | 7/2014 | Liu ............... A24F 40/42 131/329 |
| 2014/0196716 A1* | 7/2014 | Liu ............... A24F 40/46 128/202.21 |
| 2014/0196731 A1 | 7/2014 | Scatterday |
| 2014/0270727 A1* | 9/2014 | Ampolini ............ A24F 40/50 392/394 |
| 2014/0345635 A1* | 11/2014 | Rabinowitz ......... A24B 15/167 131/352 |
| 2014/0353856 A1 | 12/2014 | Dubief |
| 2014/0374289 A1 | 12/2014 | Liu |
| 2015/0059784 A1* | 3/2015 | Liu ............... A24F 40/40 131/329 |
| 2015/0101945 A1 | 4/2015 | Scatterday |
| 2016/0053988 A1* | 2/2016 | Quintana ............ F22B 1/284 392/397 |

FOREIGN PATENT DOCUMENTS

| | | |
|---|---|---|
| CN | 202122096 U | 1/2012 |
| CN | 203318894 U | 12/2013 |
| CN | 203435686 U | 2/2014 |
| CN | 203492785 U | 3/2014 |
| EP | 2186537 A1 | 5/2010 |
| EP | 2253233 A1 | 11/2010 |
| EP | 2325093 A1 | 5/2011 |
| JP | 2001-165437 A | 6/2001 |
| WO | WO-2011/033396 A1 | 3/2011 |
| WO | WO-2011/117580 A2 | 9/2011 |
| WO | WO-2012/021972 A1 | 2/2012 |
| WO | WO 2012/109371 A1 | 8/2012 |
| WO | WO 2013/141906 | 9/2013 |
| WO | WO 2013/141907 | 9/2013 |
| WO | WO 2013/141994 | 9/2013 |
| WO | WO 2013/141998 | 9/2013 |
| WO | WO 2013/142671 | 9/2013 |
| WO | WO 2013/142678 | 9/2013 |
| WO | WO 2014/113592 | 7/2014 |

* cited by examiner

HEATING CONTROL FOR VAPORIZING DEVICE

CROSS-REFERENCE TO RELATED APPLICATIONS

This application is a continuation of U.S. application Ser. No. 14/832,202, filed on Aug. 21, 2015, which claims the benefit of priority to U.S. Provisional Application No. 62/040,732, filed on Aug. 22, 2014, each of which is incorporated by reference herein in its entirety.

TECHNICAL FIELD

The present disclosure generally relates to electronic vaporizing devices and methods of use thereof.

BACKGROUND

A typical e-cigarette includes a thin nichrome or kanthal wire as a heating element. Nichrome and kanthal have a relatively high resistance such that passing current through them results in heating. The heating wires are typically controlled either by the user powering the device during an inhalation, or by sensing airflow within the device, which is the trigger for powering the heating coil. This type of "open loop" control with no information on the temperature of the wire can be cost effective, but has drawbacks. The heating wire can be over-heated, charring the wick and creating a burnt taste. Additionally, charring the wick can reduce its ability to transport liquid, thus reducing the vapor output of the device.

BRIEF SUMMARY

The present disclosure includes a vaporizing device comprising a heating element; a power source; at least one sensor in electronic communication with the heating element and the power source; and a processor configured to perform a method of controlling a temperature of the heating element, the method comprising: receiving a resistance measurement of the heating element from the at least one sensor; determining a temperature of the heating element based on the resistance measurement; and adjusting an amount of power provided from the power source to the heating element based on the determined temperature of the heating element. The vaporizing may further comprise a memory that stores instructions to perform the method. The power source may comprise a battery, such as a rechargeable battery, or other suitable power source. According to some aspects of the present disclosure, the memory may be configured to store data related to usage characteristics of the vaporizing device.

The method performed by the processor may include repeating the receiving, determining, and adjusting steps after a predetermined time interval. For example, the predetermined time interval may range from 5 ms to 1000 ms. In some embodiments, the step of adjusting the amount of power may include comparing the determined temperature to a temperature threshold. Additionally or alternatively, the step of determining the temperature of the heating element may be based on a chemical composition of the heating element. According to some aspects of the present disclosure, the heating element of the vaporizing device may comprise iron, chromium, aluminum, nickel, titanium, platinum, molybdenum, or a combination thereof. For example, the heating element may comprise the heating element comprises an alloy of chromium and nickel, or an alloy of iron, chromium, and nickel.

The present disclosure further includes a method of controlling temperature of a vaporizing device, comprising: receiving a resistance measurement of a heating element of the vaporizing device; determining a temperature of the heating element based on the resistance measurement; and adjusting an amount of power provided from a power source of the vaporizing device to the heating element based on the determined temperature of the heating element. In some embodiments, the method may further comprise supplying power from the power source to the heating element, and terminating the power before receiving the resistance measurement. For example, the power may be terminated about 10 ms or about 5 ms after supplying the power. In some embodiments, the resistance measurement may then be received from about 3 ms to about 5 ms after terminating the power. The method is repeated after a predetermined time interval, e.g., once, twice, three times, etc., for a total of n times, where n is an integer greater than 1. In some embodiments, the predetermined time interval may range from 5 ms to 1000 ms, from 10 ms to 500 ms, from 5 ms to 100 ms, such as a predetermined time interval of 10 ms, 50 ms, or 100 ms. In some embodiments, the step of adjusting the amount of power may include comparing the determined temperature to a temperature threshold.

The present disclosure further includes a method of controlling temperature of a vaporizing device, comprising: supplying a first amount of power from a power source of the vaporizing device to a heating element of the vaporizing device; terminating the power to the heating element; after terminating the power, receiving a resistance measurement of the heating element; determining a temperature of the heating element based on the resistance measurement; and supplying a second amount of power to the heating element based on the determined temperature of the heating element. The second amount of power may be determined by comparing the determined temperature to a temperature threshold. According to some aspects, the method may repeated one or more times (e.g., n times, wherein n is an integer) after a predetermined time interval. Supplying the first amount of power may be triggered by activation of the vaporizing device by measuring a pressure change with a sensor of the vaporizing device, for example, and/or upon user input, such as activation of a button or other user element.

DETAILED DESCRIPTION

Particular aspects of the present disclosure are described in greater detail below. The terms and definitions as used and clarified herein are intended to represent the meaning within the present disclosure. The patent literature referred to herein is hereby incorporated by reference. The terms and definitions provided herein control, if in conflict with terms and/or definitions incorporated by reference.

The singular forms "a," "an," and "the" include plural reference unless the context dictates otherwise. The term "about" refers to being nearly the same as a referenced number or value, and generally should be understood to encompass ±5% of a specified amount or value.

The present disclosure includes devices and methods for controlling the temperature of a vaporizing device, e.g., electronic cigarettes, electronic cigars, vaping devices, electronic pipes, electronic hookahs, and the like. By measuring the temperature or other heating or usage characteristics of the heating element, a "closed loop" temperature control may be possible. Embodiments of the present disclosure may allow the temperature of a heating element to be controlled based on prior history of heating and/or prior usage characteristics of the heating element. Controlling the temperature of the heating element according to the present disclosure may increase the efficiency of the vaporizing device, e.g., by extending the lifetime of the battery. Further, the heating control of the present disclosure may provide for a more satisfactory user experience, e.g., by avoiding overheating of the heating element that can damage the wick and/or preventing degradation of the liquid used to generate aerosol, which can lead to harmful or poor-tasting reaction byproducts.

The resistance of a material used in heating elements such as nichrome and kanthal generally increases with temperature. See, e.g., FIG. 1 for a graph of resistance (ohms) versus temperature (° C.) for nichrome wire, showing measured/actual resistance values (Rh ACT) and modeled values (Rh MOD) (see discussion below). For relatively small temperature differences, the relationship between temperature and resistance can be approximated with a straight line (i.e., a linear approximation). The slope of the line (change in resistance/change in temperature) is known as the Temperature Coefficient of Resistance (TCR) of the material. The larger the TCR, the easier it will be to measure a meaningful resistance change to use as a surrogate for temperature change. For example, with the curve shown in FIG. 1, a temperature change from 50° C. to 300° C. (ΔT=250° C.) results in approximately a 0.1Ω resistance change.

Small changes in resistance can be challenging to measure reliably with low-cost electronics. The TCR of a material may be increased by changing the chemical composition of the material, e.g., to facilitate measuring changes in resistance as a function of temperature or vice versa. In some embodiments of the present disclosure, the composition of the heating element may be chosen at least partially based on a desired TCR. For example, nichrome is an alloy comprising approximately 80% nickel (Ni) and 20% chromium (Cr), with a TCR of 0.000085 Ω/Ω/C between 0° C. and 100° C. By substituting at least a portion of the Ni with iron (Fe), such that the chemical composition is about 35% nickel (Ni), 45% iron (Fe), and 20% chromium (Cr), the TCR of the alloy (STABLOHM 610 TOPHET D, by California Fine Wire) increases to 0.0004 Ω/Ω/C (almost a 5-fold increase). In some embodiments, the TCR of the alloy may be further increased by adding one or more elements other than Fe that have a high TCR (e.g., titanium, molybdenum, and/or platinum, etc.). Other metals and metal alloy compositions suitable for the heating element will be apparent to the skilled artisan in accordance with the exemplary embodiments and principles disclosed herein.

Figure 1:
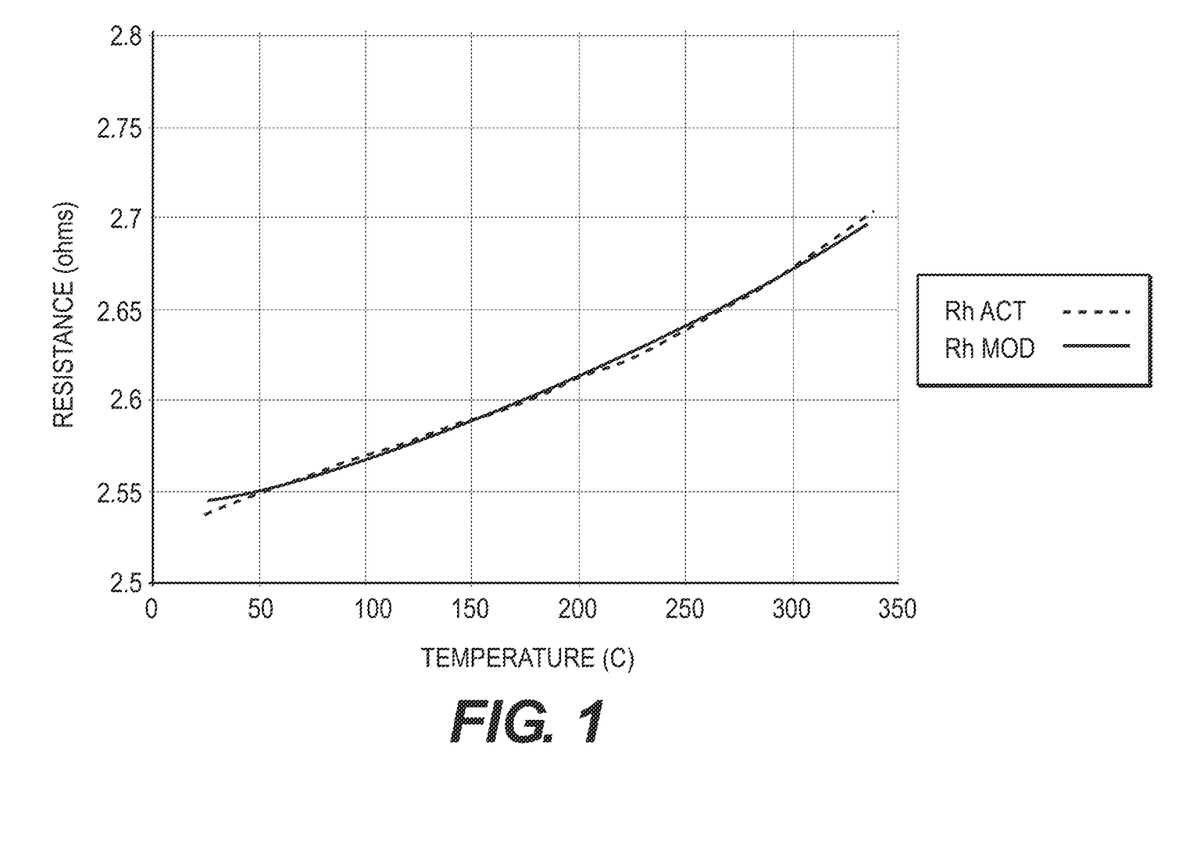
FIG. 1 shows a graph of resistance versus temperature for nichrome wire.

A mathematical approximation of the relationship between resistance and temperature may be used to determine the resistance of a material from its temperature, and vice versa. For example, a linear approximation may be used where the coefficient of resistance does not change significantly over a given temperature range according to Equation 1:

$$R_2(T_2)=R_1(1+TCR(T_2-T_1))$$ Eq. 1 where $R_1$ is the resistance at temperature $T_1$, $R_2$ is the resistance at temperature $T_2$, and TCR is the coefficient of resistance. A higher order approximation may be made to account for changes in the coefficient of resistance over the temperature range. FIG. 1 shows a second order approximation (Rh MOD) for nichrome wire according to Equation 2:

$$R(T)=R(25° \text{ C.})\times(1+TC1(T-25° \text{ C.})+TC2(T-25° \text{ C.})^2)$$ Eq. 2 where R(25° C.)=2.545, TC1=100 ppm/° C., and TC2=0.3 ppm/° $C.^2$.

A typical heating cycle of a vaporizing device may be about 2 seconds (2,000 ms) or longer. The vaporizing device may include an algorithm applied to control the temperature of the heating element based on a measured resistance within a given time period. For example, the vaporizing device may include an integrated circuit and/or processor to control the amount of power supplied to the heating element (e.g., current supplied by a battery or other power supply) via the algorithm. The heating element may comprise any suitable material or combination of materials having a relatively high TCR, including, but not limited to, metals and metal alloys such as STABLOHM 610. In some embodiments, for example, the heating element may comprise one or more of the following materials: iron, chromium, aluminum, nickel, titanium, platinum, and/or molybdenum. The temperature of the heating element during operation may range from about 20° C. to about 500° C., such as from about 50° C. to about 450° C., from about 100° C. to about 400° C., from about 150° C. to about 350° C., or from about 200° C. to about 300° C.

Various aspects of the present disclosure may be used with and/or include one or more of the features or configurations (e.g., components of a vaporization unit and/or other components or features of a vaporizing device, characteristics of a processor and/or algorithm, etc.) disclosed in U.S. Provisional Application No. 61/971,340, filed Mar. 27, 2014, entitled "Devices and Methods for Extending Battery Power"; U.S. Provisional Application No. 61/970,587, filed Mar. 26, 2014, entitled "Vaporizing Devices Comprising a Wick and Methods of Use Thereof"; U.S. Provisional Application No. 61/968,855, filed Mar. 21, 2014, entitled "Vaporizing Devices Comprising a Core and Methods of Use Thereof"; U.S. Provisional Application No. 61/938,451, filed Feb. 11, 2014, entitled "Electronic Cigarette with Carbonaceous Material"; U.S. application Ser. No. 14/284,194, filed May 21, 2014, and published as US 2014/0345635 A1, entitled "Compositions, Devices, and Methods for Nicotine Aerosol Delivery," and/or U.S. Provisional Application No. 62/020,068, filed Jul. 2, 2014, entitled "Devices and Methods for Vaporization"; the disclosures of each of which are incorporated by reference herein in their entireties.

Figure 2:
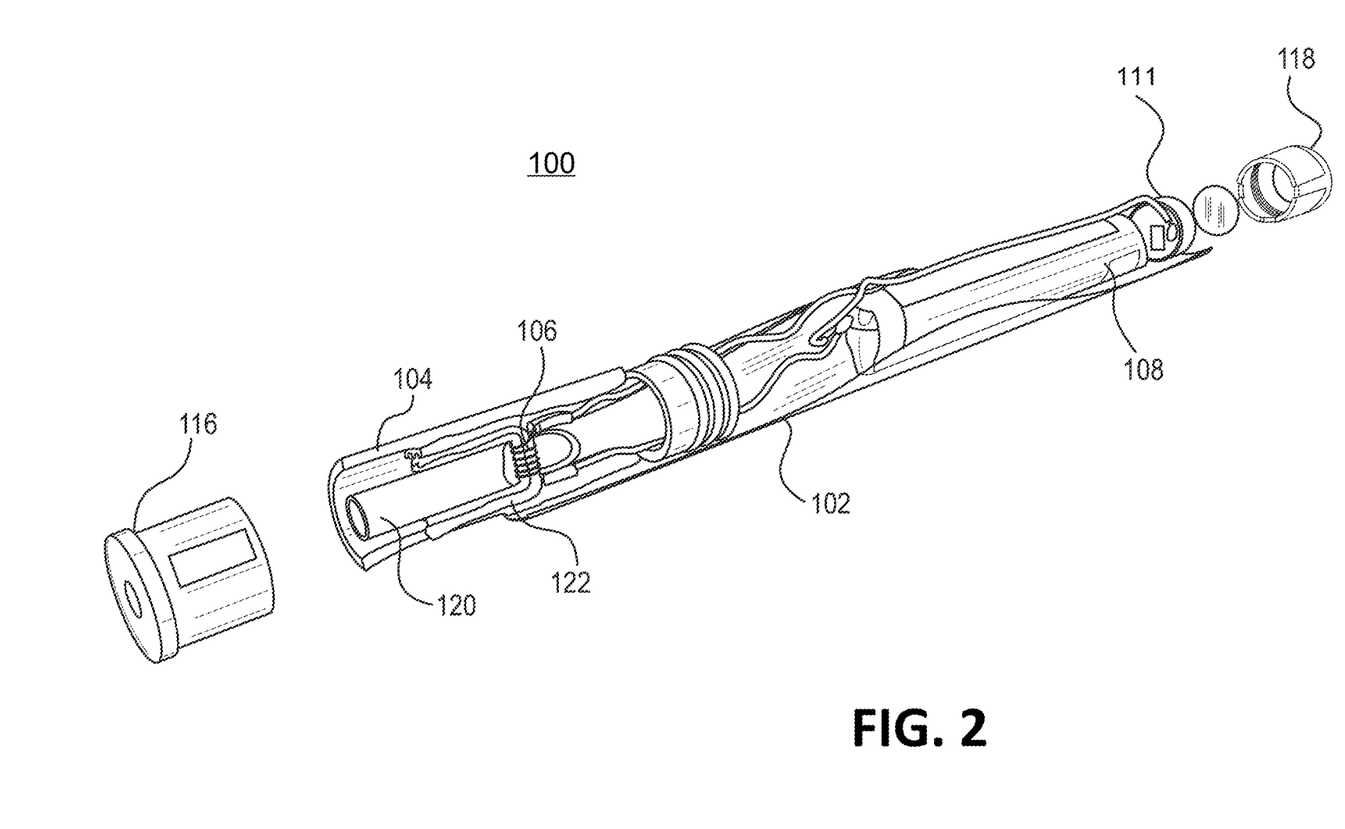
FIG. 2 shows an exemplary vaporizing device, in accordance with one or more embodiments of the present disclosure.
Figure 3:
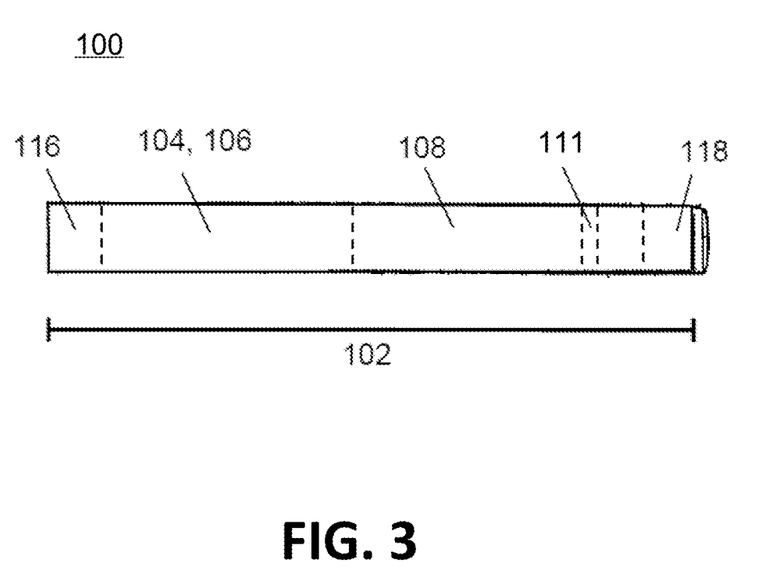
FIG. 3 shows an exemplary vaporizing device, in accordance with one or more embodiments of the present disclosure.
Figure 4:
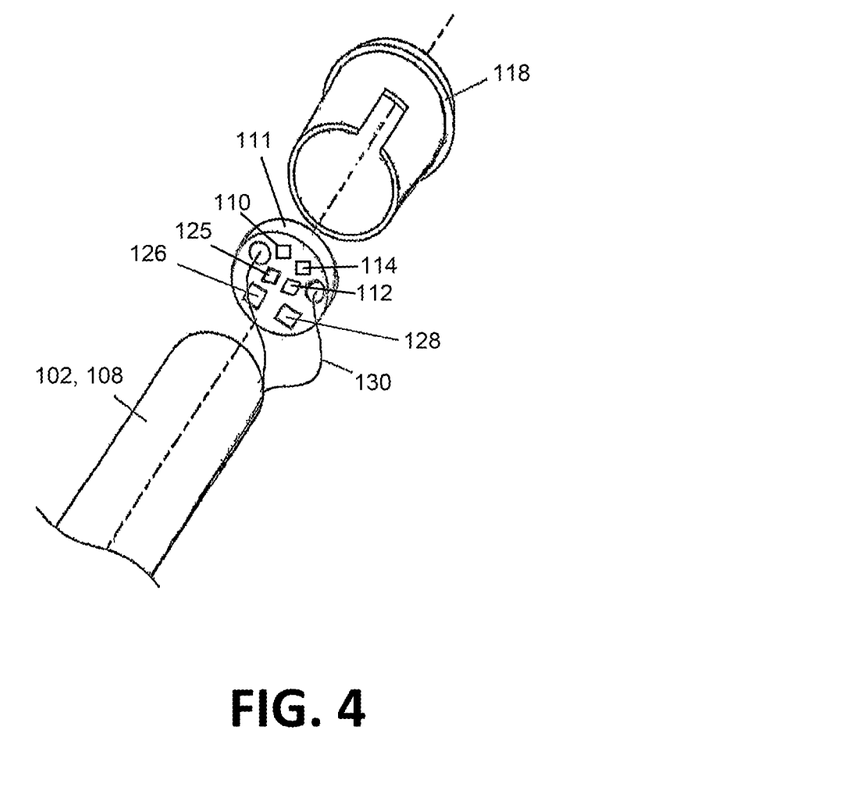
FIG. 4 shows an exemplary vaporizing device, in accordance with one or more embodiments of the present disclosure.

FIGS. 2-4 illustrate components of an exemplary electronic cigarette 100 according to one or more embodiments of the present disclosure, the electronic cigarette 100 comprising a reservoir 104 (e.g., comprising an absorbent material saturated with a liquid for generating aerosol; see exploded, partial cross-section view in FIG. 2), a heating element 106, a wick 122, an air tube or conduit 120, a battery 108, a printed circuit board (PCB) 111, an integrated circuit 110, a processor or microprocessor 125 (see FIG. 4), memory 126, a transmitter 128, at least one sensor 112 (e.g., an air flow sensor and/or temperature sensor), and/or at least one light source 114, e.g., a light-emitting diode (LED). Although depicted as separate components in FIG. 4 for illustration purposes, the integrated circuit 110 may include (or function as) the processor 125 and/or the memory 126. The electronic cigarette 100 may comprise a housing 102 that completely covers all internal components of the electronic cigarette 100, as shown in FIG. 3 (dashed lines in FIG. 3 show the general division of cigarette housing portions that enclose the various components). The electronic cigarette 100 may include a mouthpiece 116 insertable in a first end of the housing 102 and a tip portion 118 insertable in a second end of the housing 102. While FIGS. 2-4 illustrate an exemplary type of vaporizing device and combination of internal components, vaporizing devices according to the present disclosure need not include each and every component shown. In some embodiments, for example, the housing 102 may comprise two or more components configured to be disassembled for purposes of charging or replacing a battery and/or replacing a liquid-containing cartridge. In some embodiments, the vaporizing device may be a vaping device.

As shown in FIG. 4, the battery 108 may be coupled to the integrated circuit 110, e.g., via one or more wires 130 for supplying power to the integrated circuit 110. Suitable types of integrated circuits 110 according to the present disclosure may include, but are not limited to, analog, digital, and mixed signal integrated circuits, application-specific integrated circuits (ASICs), and microprocessors. In some embodiments, one or more sensor(s) 112 and/or one or more light source(s) 114 may be directly coupled to the integrated circuit 110, as shown in FIG. 4, or may otherwise be operably coupled to the integrated circuit 110 to transmit and receive information. In some embodiments, the integrated circuit 110, the sensor(s) 112, the light source(s) 114, the processor 125, the memory 126, and/or the transmitter(s) 128 may be coupled via a PCB 111 as shown in FIG. 4. The shaft of the tip portion 118 may have an inside diameter larger than the outside diameter of the PCB 111 so that the PCB 111 may be held securely within the shaft.

The processor 125 may include any suitable microprocessor, e.g., a programmable microprocessor. The processor 125 may use an algorithm, such as a computer algorithm executed via a software program, to monitor and/or store data related to the use and/or the status of the electronic cigarette 100. For example, the processor 125 may retrieve a set of instructions stored in the memory 126. In some embodiments, the memory 126 additionally or alternatively may store data related to usage characteristics of the electronic cigarette 100. Such usage characteristics may include, but are not limited to, the age and/or power level of the battery 108; the average, maximum, and/or minimum amount of power supplied from the battery 108 to the heating element 106; the amount of time that the battery 108 has been in operation over a given period of time; the cumulative operating time of the battery 108, the average duration of a puff (e.g., measured with an air flow sensor), and/or the frequency of use of the electronic cigarette 100.

In some embodiments, the processor 125 may be coupled to one or more sensor(s) 112, e.g., for monitoring use of the electronic cigarette 100 (or characteristics of the user) and/or the status of various components of the electronic cigarette 100. Examples of sensors 112 suitable for the present disclosure include pressure sensors, accelerometers or other motion sensors, flow rate sensors, heat or temperature sensors, moisture sensors, electrical current and/or resistance sensors or measurement modules (e.g., integrated circuit sensor), and other devices and components for detecting various environmental, chemical, or biological conditions or phenomena. In at least one embodiment, the one or more sensors 112 may include an air flow sensor and a measurement module configured to measure the resistance of the heating element 106.

The processor 125 may be in electronic communication with the sensor(s) 112, the heating element, 106, and the battery 108, e.g., such that the processor 125 may transmit instructions and/or receive data from each of the sensor(s) 112, heating element 106, and the battery 108. For example, the processor 125 may receive data from the sensor(s) 112 and/or may transmit instructions to the battery 108 to supply or terminate power to the heating element 106.

In some embodiments, for example, the integrated circuit 110 may include a control algorithm that operates as follows. About 10 ms after initiating a heating cycle (e.g., via user activation of the vaporizing device through manual user input and/or sensor-driven control), the controller (e.g., the integrated circuit 110) may stop heating (e.g., by sending instructions to the battery 108 to terminate a supply of power to the heating element 106) and take a resistance measurement of the heating element within about 3-5 ms. The resistance measurement may be transformed into a temperature measurement (e.g., via a relationship between resistance and temperature characteristic of the material(s) of the heating element 106 that may be pre-programmed into the integrated circuit 110 and/or the memory 126) and the controller may adjust the percent power to the heating element based on the difference between the desired set point/target temperature and the measured temperature value. About 10 ms later, the controller may measure resistance of the heating element once more and adjust power supplied to the heating element accordingly.

In some embodiments, the process of measuring resistance and adjusting power to the heating element accordingly may continue as long as the device is activated, e.g., via a user inhale. With this control algorithm, the heating element may be driven with different power levels (e.g., ranging from 0 to 100%) depending on the last measured temperature value of the heating element.

The control algorithm may measure resistance in time intervals greater than, or less than 10 ms, such as 1 ms, 2 ms, 3 ms, 4 ms, 5 ms, 6 ms, 7 ms, 8 ms, 9 ms, or 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, 100 ms, 150 ms, 200 ms, 250 ms, 300 ms, 350 ms, 400 ms, 450 ms, 500 ms, 750 ms, 1000 ms, or 1500 ms, for example. In some embodiments, the control algorithm may take resistance measurements in the same time interval (e.g., every 10 ms, every 50 ms, every 100 ms, etc.), or may take resistance measurements at different time intervals (e.g., after 50 ms, then after 10 ms, then after 5 ms, etc.).

In some embodiments, the time interval may not be constant or pre-programmed, but may vary depending on information provided to the controller (e.g., transmitted to the integrated circuit 110) as the vaporizing device operates, such as over the period of a single inhale and/or multiple inhales by a user. For example, in some embodiments, the measurement time interval may be adjusted based on the measured temperature, the set point/target temperature, and/or the difference between the measured temperature of the heating element and the set point/target temperature. In some embodiments, the time interval may vary depending on usage characteristics of the device. For example, the time interval may be shorter or longer depending on the duration of a puff, the frequency of use of the device, the amount of time that the battery has been in operation over a given period of time, and/or the lifetime of the battery.

Any features discussed on connection with a particular embodiment may be used in any other embodiment disclosed herein. Further, other embodiments of the present disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A vaporizing device comprising:
   a heating element;
   a power source;
   a memory;
   one or more sensors in electronic communication with the heating element and the power source; and
   a processor configured to perform a method of controlling a temperature of the heating element, the method comprising:
      supplying a first amount of power from the power source to the heating element;
      terminating the first amount of power to the heating element;
      receiving, from the one or more sensors, a first resistance measurement of the heating element;
      determining a first temperature of the heating element based on the first resistance measurement;
      determining, using at least one of the one or more sensors, an average duration of a puff from the device;
      controlling a second amount of power supplied from the power source to the heating element based on a difference between the first temperature of the heating element and a target temperature of the heating element stored in the memory, the second amount of power being different from the first amount of power; and
      after a predetermined time interval, terminating the second amount of power;
   wherein the memory stores data including the average duration of a puff from the device, and the device varies the predetermined time interval via sensor driven control based on the average duration of a puff from the device.

2. The device of claim 1, wherein the first amount of power is terminated about 10 ms after supplying the first amount of power.

3. The device of claim 1, wherein the first resistance measurement is received from about 3 ms to about 5 ms after terminating the first amount of power.

4. The device of claim 1, wherein the predetermined time interval ranges from 5 ms to 1000 ms; and wherein the average duration of a puff from the device is determined during the supplying the first amount of power from the power source to the heating element.

5. The device of claim 1, wherein the one or more sensors comprises at least one of an air flow sensor or a pressure sensor.

6. The device of claim 1, wherein the memory is configured to store the first resistance measurement and the first temperature.

7. The device of claim 1, wherein the power source comprises a battery.

8. The device of claim 1, wherein the memory stores data related to usage characteristics of the device, and the device is configured to vary the predetermined time interval via sensor driven control based on the usage characteristics.

9. The device of claim 8, where the usage characteristics include an age of the power source, an average amount of power supplied from the power source to the heating element, a maximum amount of power supplied from the power source to the heating element, a minimum amount of power supplied from the power source to the heating element, an amount of time that the power source has been in operation, a cumulative operating time of the power source, a frequency of use of the device, or a combination thereof.

10. The device of claim 1, wherein the heating element comprises iron, chromium, aluminum, nickel, titanium, platinum, molybdenum, or a combination thereof.

11. The device of claim 8, wherein the memory stores data related to a power level of the power source, and the device is configured to vary the predetermined time interval via sensor driven control based the power level of the power source.

12. A vaporizing device comprising:
    a heating element;
    a battery;
    a memory;
    one or more sensors in electronic communication with the heating element and the battery; and
    a processor configured to perform a method of controlling a temperature of the heating element, the method comprising:
       supplying a first amount of power from the battery to the heating element;
       terminating the first amount of power to the heating element;
       receiving, from the one or more sensors, a first resistance measurement of the heating element;
       determining a first temperature of the heating element based on the first resistance measurement;
       determining, using at least one of the one or more sensors, an average duration of a puff from the device;
       controlling a second amount of power supplied from the battery to the heating element based on a difference between the first temperature of the heating element and a target temperature of the heating element stored in the memory, the second amount of power being different from the first amount of power;
       determining an average amount of power supplied from the battery to the heating element using at least one of the one or more sensors; and
       after a time interval, terminating the second amount of power;
    wherein the memory is configured to store data including the average amount of power supplied from the battery to the heating element, and wherein the device is configured to vary the time interval via sensor driven control based on the average amount of power.

13. The device of claim 12, wherein the first amount of power is terminated about 10 ms after supplying the first amount of power.

14. The device of claim 12, wherein the time interval ranges from 5 ms to 1000 ms.

15. The device of claim 12, wherein supplying the first amount of power is triggered by activation of the device by measuring a pressure change with a sensor of the one or more sensors of the device or upon user input.

16. The device of claim 12, wherein the time interval is a function of a lifetime of the battery.

17. The device of claim 12, wherein the heating element comprises iron, chromium, aluminum, nickel, titanium, platinum, molybdenum, or a combination thereof.

18. The device of claim 12, wherein the heating element comprises an alloy of iron, chromium, and nickel.

19. A vaporizing device comprising:
    a heating element;
    a battery;
    a memory;
    one or more sensors in electronic communication with the heating element and the battery; and
    a processor configured to perform a method of controlling a temperature of the heating element, the method comprising:
        supplying a first amount of power from the battery to the heating element;
        terminating the first amount of power to the heating element;
        determining, using at least one of the one or more sensors, an average duration of a puff from the device;
        controlling a second amount of power supplied from the battery to the heating element based on a difference between a first temperature of the heating element and a target temperature of the heating element stored in the memory, the second amount of power being different from the first amount of power, wherein the first temperature is measured by at least one of the one or more sensors; and
        after a time interval, terminating the second amount of power;
    wherein the device is configured to vary the time interval via sensor driven control based on the average duration of a puff.

20. The device of claim 19, wherein the one or more sensors is configured to measure a plurality of usage characteristics of the device, and the device is configured to vary the time interval via sensor driven control based on the plurality of usage characteristics.

* * * * *